US008762040B2

(12) United States Patent
Depape et al.

(10) Patent No.: US 8,762,040 B2

(45) Date of Patent: Jun. 24, 2014

(54) METHOD AND DEVICE TO HELP AN AIRCRAFT TO ALTITUDE CHANGE IN CASE OF REDUCED SEPARATIONS

(75) Inventors: Pierre Depape, Paulhac (FR); Christophe Maily, Toulouse (FR); Jerome Gouillou, Toulouse (FR); Julien Frard, Vallesvilles (FR); Yohann Barbe, Toulouse (FR)

(73) Assignee: Airbus Operations (SAS), Toulouse Cedex (FR)

( * ) Notice: Subject to any disclaimer, the term of this patent is extended or adjusted under 35 U.S.C. 154(b) by 505 days.

(21) Appl. No.: 12/774,374

(22) Filed: May 5, 2010

(65) Prior Publication Data

US 2010/0286900 A1 Nov. 11, 2010

(30) Foreign Application Priority Data

May 7, 2009 (FR) ..................................... 09 02224

(51) Int. Cl.
*G06F 19/00* (2011.01)

(52) U.S. Cl.
USPC .......... 701/120; 701/29.3; 701/103; 701/114; 701/121; 701/528

(58) Field of Classification Search
None
See application file for complete search history.

(56) References Cited

U.S. PATENT DOCUMENTS

| | | | | |
|---|---|---|---|---|
| 5,136,512 | A * | 8/1992 | Le Borne | 701/301 |
| 6,154,151 | A * | 11/2000 | McElreath et al. | 340/970 |
| 6,433,729 | B1 | 8/2002 | Staggs | |
| 6,604,044 | B1 * | 8/2003 | Kirk | 701/120 |
| 7,702,427 | B1 * | 4/2010 | Sridhar et al. | 701/4 |
| 2003/0004641 | A1 | 1/2003 | Corwin | |
| 2004/0143393 | A1 * | 7/2004 | Knecht et al. | 701/301 |
| 2007/0239986 | A1 * | 10/2007 | Viggiano et al. | 713/168 |

OTHER PUBLICATIONS

Safety, Performance and Interoperability Requirements Document for ATSA-ITP Application, EUROCAE, ED-159, Jul. 2008.

Samanant, et al., "Casper/Ails: An Integrated DGPS/ADS-B Airborne Alerting System for Closely Spaced Parallel Approaches," 20000313; Mar. 13, 2000, pp. 57-65.

Roxaneh Chamlou, et al., "Exploration of New Algorithms for Airborne Collision Detection and Avoidance to Meet NextGen Capabilities," Digital Avionics Systems Conference, 2008.

Duong, et al., "Conflict Resolution Advisory Service in Autonomous Aircraft Operations," Digital Systems Conference, 1997.

* cited by examiner

*Primary Examiner* — Fateh Obaid

(74) *Attorney, Agent, or Firm* — Novak Druce Connolly Bove + Quigg LLP

(57) ABSTRACT

A method and device to help an aircraft change altitude in case of reduced separations is disclosed. The device, embarked on board the airplane, comprises means for determining a performing time range during which the altitude change maneuver within reduced spacings being desired by the pilots is able to be performed.

8 Claims, 3 Drawing Sheets

METHOD AND DEVICE TO HELP AN AIRCRAFT TO ALTITUDE CHANGE IN CASE OF REDUCED SEPARATIONS

CROSS-REFERENCE TO RELATED APPLICATIONS

This application claims priority to French Patent Application 0902224, filed May 7, 2009, the entire contents of which are incorporated herein by reference.

FIELD OF THE INVENTION

The present invention relates to a method and a device for facilitating an altitude change maneuver within reduced spacings of an airplane, including, but not exclusively, within air spaces without any controlled or uncontrolled radar coverage. This invention also relates to an airplane comprising such a device.

BACKGROUND OF THE INVENTION

It is known that most current airplanes including airliners, are provided with an traffic function ATSAW (Airborne Traffic Situational AWareness), allowing to determine, for a given airplane, information regarding the air traffic around the airplane from data exchanged with surrounding airplanes.

The data to be exchanged essentially originate from communication systems ADS-B (Automatic Dependant Surveillance-Broadcast), but also from on-board collision avoidance systems TCAS (Traffic alert and Collision Avoidance System).

The information from surrounding aircrafts (relative position, altitude, course, velocity, identification, etc.) can be displayed in the cockpit of the airplane, either graphically on a navigation screen, or textually on a multifunction control and display device.

From such information, the crew of an airplane could decide to perform (through the ATSAW function) an altitude change towards a more appropriate altitude level, within an air space without any radar coverage (either controlled or not), according to an in-travel altitude change ITP (In Trail Procedure) within reduced spacings, as defined and regulated (velocity, separation distance, etc.) by the International Civil Aviation Organisation (or OACI). The ITP procedure is particularly detailed in <<Safety, Performance and Interoperability Requirements Document for ATSA-ITP Application>> published by the EUROCAE (ED159) and the RTCA (D0 312).

An altitude change within reduced spacings in accordance with the ITP procedure, taking into account standards of minimum separation between airplanes in times and (horizontal and vertical) distances enforced by the OACI, is controlled and monitored by controlling the air traffic, in charge of meeting such standards.

Such an altitude change allows particularly:

- to reduce fuel consumption of the airplane while reaching an optimum cruising altitude level and, consequently, to reduce the emissions of polluting gas;
- to improve the flight quality and safety, for instance while reaching altitude levels with more favorable winds on the trajectory being followed;
- to indirectly increase the traffic on the air space in question (an airplane releasing its current altitude level offers its place to another airplane);
- etc.

For performing an altitude change within reduced spacings in accordance to the rules in force, the crew of an airplane preliminarily observes the air traffic around the airplane (on the navigation screen and/or on the multifunction control and display device), then, if he judges that the altitude change is feasible, he submits a clearance request to the air traffic control. After checking and meeting the separation standards between airplanes in the given air space, the air traffic controller grants a clearance or not.

However, should clearance be denied, the crew is not aware of the origin of such a denial (for instance, the aircraft(s) preventing the altitude change maneuver). They will be then able to reiterate their clearance request later on, without being more certain to get it, namely because their request relies on a vague and inaccurate observation of the surrounding air traffic. Also, performing an altitude change maneuver within reduced spacings currently remains very random.

SUMMARY OF THE INVENTION

The aim of the present invention is to overcome such drawbacks, and, more particularly, to facilitate performing such an altitude change maneuver within reduced spacings.

To this end, according to this invention, the method for facilitating performing an altitude change maneuver within reduced spacings of an airplane flying at a current altitude level, according to a given course, for capturing a target altitude level, said airplane being provided with receiving means for information relating to aircrafts flying in an air environment in the vicinity of said airplane, is remarkable in that it comprises the following steps of:

- defining a target altitude level to be captured;
- determining a control volume around said airplane, a first dimension of which is a function of the altitude difference between said current level and said target level, a second dimension of which depends on a first distance threshold and a third dimension of which depends on a second distance threshold;
- locating the presence of at least one aircraft inside said control volume;
- should at least one aircraft be located in said control volume, checking that the following activation conditions are met:
  - the distance separating said airplane from said located aircraft is strictly lower than said first distance threshold and is at least equal to a third distance threshold; and
  - the angle formed between the course of said airplane and the course of said located aircraft is at most equal to a predefined angle threshold; and
- when said located aircraft meets said activation conditions, determining from information from said located aircraft received by said receiving means, a performing time range upon which said altitude change maneuver is able to be performed.

Thus, according to this invention, for a given target altitude level, the pilots are aware, on the one hand, of the feasibility or not of the altitude change maneuver within reduced spacings for reaching such target level (meeting the separation standards enforced by the OACI) and, on the other hand, of the starting and ending times of the time range during which they are authorized to perform the altitude change maneuver. In addition, sending a request for an altitude change to the air traffic control is avoided, whereas the altitude change maneuver within reduced spacings is not to be contemplated.

Moreover, said receiving means for information relating to aircrafts flying in an air environment in the vicinity of said airplane could advantageously be of the ADS-B type, i.e. they receive, via ADS-B format messages, for example, the following information on the surrounding aircrafts: position, velocity, identification, trajectory to be followed, etc.

Moreover, said time range is preferably determined only when at least one and at the most, two aircrafts is or are located in said control volume and that they meet each of said activation conditions.

Preferably, said performing time range is determined from the relative velocity of said airplane with respect to said located aircraft meeting said activation conditions and from the relative position of said airplane with respect to said aircraft.

Advantageously, a performing authorization request is automatically generated so as to be transmitted, on pilots' order, to the air traffic control.

Thus, the communication between pilots and the air traffic control is made easier, while reducing the pilots' work load and error risk from them.

Said authorization request could advantageously comprise relative position information of said airplane with respect to said located aircraft meeting said activation conditions, as well as information regarding the desired altitude change maneuver (target altitude level, type of maneuver, etc.).

Furthermore, said control volume could have the form of a rectangular parallelepiped with the height thereof corresponding to said first dimension.

The present invention additionally relates to a device for facilitating performing an altitude change maneuver within reduced spacings of an airplane flying at a current altitude level, according to a given course, for capturing a target altitude level, said airplane being provided with receiving means for information relating to aircrafts flying in an air environment in the vicinity of said airplane.

According to this invention, the device is remarkable in that it comprises:

- means for defining a target altitude level to be captured;
- means for determining a control volume around said airplane, a first dimension of which is a function of the difference of altitude between said current level and said target level, a second dimension of which depends on a first distance threshold and a third dimension of which depends on a second distance threshold;
- means for locating the presence of at least one aircraft within said control volume;
- means for checking, should at least one aircraft be located within said control volume, that the following activation conditions are met:
  - the distance separating said airplane from said located aircraft is strictly lower than said first distance threshold and is at least equal to a third distance threshold; and
  - the angle formed between the course of said airplane and the course of said located aircraft is at the most equal to a predefined angle threshold; and
- means for determining, from information from said located aircraft received by said receiving means, a performing time range during which said altitude change maneuver is able to be performed, said means being activated when said located aircraft meets said activation conditions.

Moreover, the device could also comprise means for automatically generating a performing authorization request intended to be transmitted, on pilots' order, to the air traffic control.

The present invention also relates to an aircraft comprising a device such as herein above mentioned.

BRIEF DESCRIPTION OF THE DRAWINGS

The figures of the appended drawing will make it clear how the invention could be performed. On these figures, similar reference numerals relate to similar components.

DETAILED DESCRIPTION

Figure 1:
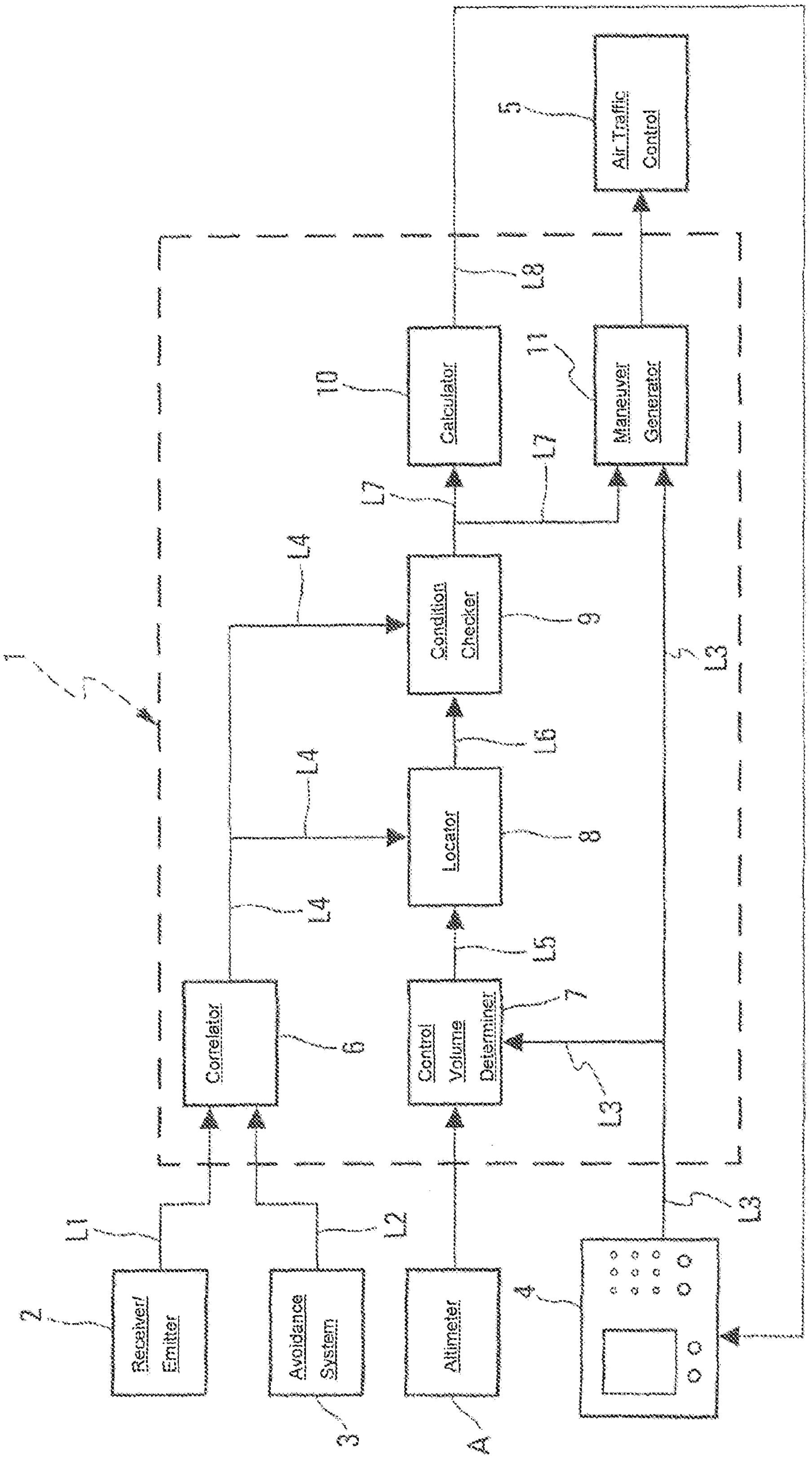
FIG. 1 is a block diagram of a device according to the present invention, able to facilitate performing an altitude change maneuver within reduced spacings for an airplane.

The device 1, conform to the invention and represented in a block diagram on FIG. 1, is intended to facilitate performing an altitude change maneuver within reduced spacings of an aircraft AC, in particular an airliner (or even a military airplane), according to the in trail altitude change procedure ITP, as defined by the OACI. Indeed, for safety and fuel consumption reasons such as those previously discussed, the pilots of the airplane AC (following a given trajectory along a determined course) may wish to pursue the flight at a target altitude level either lower or higher than the current altitude level.

Such a device 1 could be connected to the ATSAW traffic function (not shown) of the airplane AC.

On FIG. 1, there are also illustrated:

- means 2 for receiving and emitting ADS-B data messages (embarked on board the airplane AC) allowing to obtain information (position, velocity, identification, trajectory to be followed, etc.) about the aircrafts present in the air environment of the airplane AC;
- a TCAS collision avoidance system 3, also embarked on board the airplane AC, allowing to ensure the safety of the air traffic by anticipating collision risks in flight. Exchanging data between the TCAS collision avoidance system 3 of the airplane AC and that of surrounding aircrafts allows, more specifically, to obtain information relating to the relative position of each of the aircrafts with respect to the airplane AC; and
- a multifunction interface 4, on board the cockpit of the airplane AC, comprising, for instance, a control screen;
- the air traffic control 5; and
- an altimeter A.

According to one embodiment of the present invention, the target altitude level is selected by the pilots, then transmitting the latter to the device 1, for example, via the multifunction interface 4.

In accordance to this invention, the device 1, embarked on board the airplane AC, comprises:

- correlation means 6 receiving data provided by the ADS-B means 2 and the TCAS system 3, via respectively links L1 and L2. Using the Sodano equations, the correlation means 6 are adapted to check whether data received from the ADS-B means 2 match those from the TCAS system 3 and to deliver, in outlet, a signal representative of information relative of the aircrafts surrounding the airplane AC (position, course, velocity, identification, etc.). The integrity of the data to be subsequently used by the device 1 is thus ensured;

means 7 for determining a control volume V defined around the airplane AC, said means being connected to the multifunction interface 4 by the link L3. They are able to receive the target altitude level defined by the pilots (link L3), as well as the current altitude level of the airplane AC as measured by the altimeter A.

Figure 2:
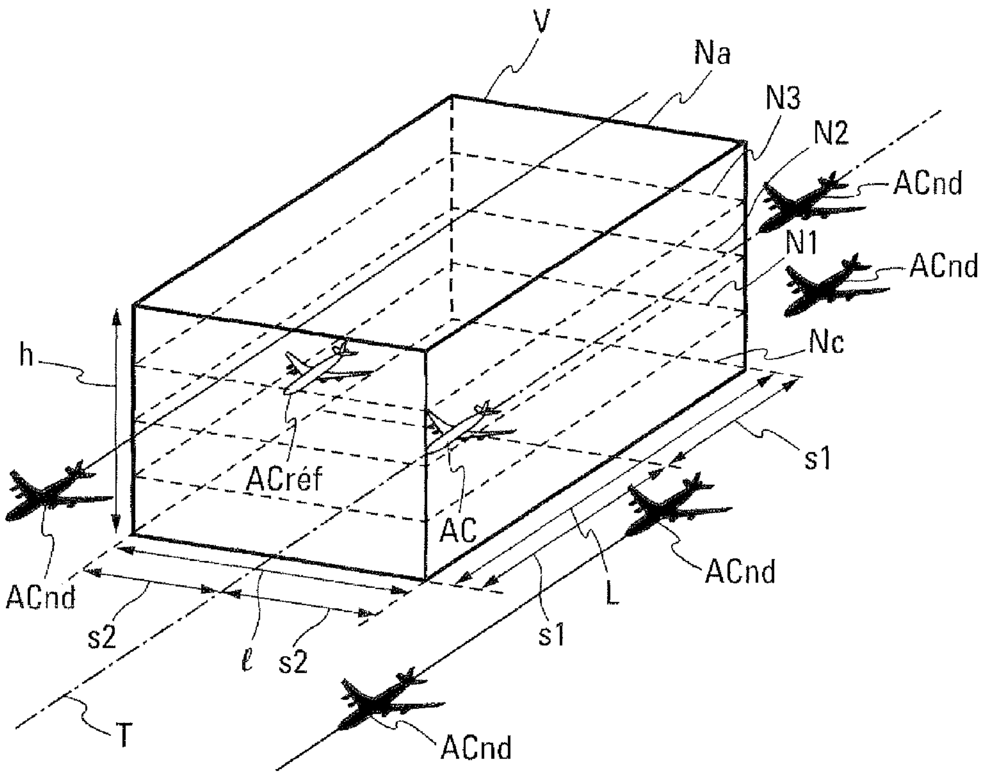
FIG. 2 schematically shows, in a perspective view, an examplary control volume according to the present invention.

In the example as shown on FIG. 2 (a case of an altitude change maneuver within reduced spacings towards a target level higher than the current level), the control volume V is a rectangular parallelepiped, having one of its horizontal sides centred on the airplane AC. Moreover, the height h (defined according to the vertical direction) of the control volume V is equal to the altitude difference between the target altitude level Na and the current altitude level Nc of the airplane AC. The length L of this volume V (in the advance direction of the airplane AC) is equal to twice the horizontal separation standard s1 (or first distance threshold) between airplanes, i.e. 160 nautical miles, and the width 1 (along a direction orthogonal to the advance direction) is equal to twice the side separation standard between airplanes of an identical altitude level s2 (or second distance threshold), i.e. 40 nautical miles, such standards being defined and enforced by the OACI.

The length L and width 1 parameters of the volume V thus depend on the separation standards between airplanes as enforced by the OACI and, consequently, are likely to be modified when new separation standards between airplanes are defined by the latter.

On FIG. 2, the horizontal planes N1 to N3 correspond to intermediary altitude levels to be crossed by the airplane AC, if the altitude change maneuver within reduced spacings is performed.

In addition, in the example of FIG. 2, the control volume V contains one single aircraft ACref located on the intermediary altitude level N1. The other aircrafts ACM represented on said FIG. 2 are outside the control volume and are thus not located by the device 1.

According to the present invention, the device 1 further comprises:

locating means 8 connected to the correlation means 6 and to the determining means 7 for the control volume, via, respectively, the links L4 and L5. From the information received (link L4) and the control volume parameters (link L5), the locating means 8 are able to locate the presence of aircrafts in the control volume V and to deliver, in outlet, a locating signal comprising information relating to the aircraft(s) located in said control volume V;

means 9 connected to the correlation means 6 and to the locating means 8, via, respectively, the links L4 and L6. When they receive a locating signal via the link L6, the checking means 9 are able to check, from information (course, position, trajectory being followed, velocity, etc.) of the locating signal and from information received by the link L4, that, for each located aircraft, the following activation conditions are met:

the distance separating the airplane AC from the located aircraft is strictly lower than the horizontal separation standard s1 and is at least equal to a ITP minimum separation distance between airplanes (or third distance threshold) enforced by the OACI for performing an in trail altitude change procedure ITP. It is obvious that other values could be used as well, with the provision that they meet the regulation as defined by the OACI, and the angle formed between the course of the airplane AC and the course of the located aircraft is at the most equal to a predefined angle threshold, for instance equal to 45°.

When at least one and at the most two located aircrafts meet the activation conditions (such aircrafts are subsequently referred to as reference aircrafts), the checking means 9 are able to emit, in outlet, an activation signal comprising information relating to such reference aircrafts (relative position with respect to the airplane AC, identification, ITP distance, etc.), as well as relating to the other aircrafts located in the control volume V. it should be appreciated that, in the case where more than two reference aircrafts are present in the control volume V, no altitude change maneuver according to the ITP procedure could be performed; and calculation means 10 connected to the checking means 9 and to the multifunction interface 4, via, respectively, the links L7 and L8. Upon an activation signal being received from the link L7, the calculation means 10 are able to determine, from information of the activation signal (including the relative position and the relative velocity of the reference aircraft with respect to the airplane AC), a performing time range during which an altitude change maneuver within reduced spacings (for reaching the target altitude level) could be performed by the pilots. The performing time range could be transmitted to the multifunction interface 4, via the link L8, so as to be available to the pilots.

According to this invention, the performing time range has an upper border being finite in the two following cases:

either the reference aircraft is ahead of the airplane AC with a velocity lower than the latter;

or the reference aircraft is behind the airplane AC with a velocity higher than the latter.

When one of the two above described cases is checked, from the velocity of reference aircrafts and of the airplane AC, the time can be determined (for example, in the form of a UTC hour) from which at least one of the reference aircrafts will no longer observe the ITP minimum distance. In the other cases (the reference aircraft is behind the airplane AC with a velocity lower than the latter, the reference aircraft is ahead of the airplane AC with a velocity higher than the latter), the upper border of the performing range will be infinite. The performing range will then be set, by default, to three hours.

Moreover, as represented on FIG. 1, the device 1 comprises means 11 for automatically generating an altitude change maneuver request within reduced spacings, being intended to the air traffic control 5. Such generating means 11 are connected to the multifunction interface 4 and to the checking means 9, via, respectively the links L3 and L7.

Upon receiving, via the link L7, an activation signal comprising information relating to the reference aircrafts (relative position with respect to the airplane AC, indicatives, ITP distance, etc.), as well as relating to the other aircrafts as located in the control volume V, the generating means 9 are able to establish an authorization request comprising information relating to the type of desired maneuver (in the present case, an altitude change maneuver within, reduced spacings), as well as information relating to the relative position of the aircrafts located in the control volume V with respect to the airplane AC. It is obvious that the authorization request could also comprise any other desired available information.

Once the authorization request is generated, the pilots of the airplane AC can send it to the air traffic control 5.

According to the present invention, an example will be described herein after of an altitude change according to the ITP procedure performed by the pilots of the airplane AC, according to the invention.

The pilots of the airplane AC can observe the aircrafts present in the air environment of said airplane AC via, for example, the multifunction interface 4.

When the pilots decide to change altitude according to the in trail altitude change procedure ITP, the pilot in charge searches the maximum altitude to be reached on the performance pages of the airplane AC. This pilot can subsequently configure the desired altitude change maneuver by entering the target altitude level to be reached in the multifunction interface 4, via a page dedicated to the altitude change according to the ITP procedure.

The device 1 of this invention then determines automatically the feasibility of the desired altitude change maneuver within reduced spacings and provides indications relating to time, position and distance with respect to the other aircrafts located in the control volume V being considered (more particularly, the reference aircrafts) being, for instance, communicated to pilots (including to the pilot not being in charge) via the multifunction interface 4 (for instance, as a list of relevant aircrafts, while distinguishing the reference aircrafts), so that they can pursue the altitude change procedure.

In the case where no aircraft is present in the control volume V, a message is sent to the pilots (for instance via the multifunction interface) for warning them about the possibility to perform the desired altitude change, with no ITP procedure. A direct access to a communication interface with the air traffic control 5, within the multifunction interface 4, could also be established.

On the other hand, in the case where, for example, two reference aircrafts are present in the control volume V to be considered, the pilot being not in charge transmits an altitude change maneuver authorization request, according to the ITP procedure, to the air traffic control 5 (for example, using pilot-controller communication means via a CPDLC data link (Controller to Pilot Data Link Communication) if the airplane AC is provided of such a link (the request is then pre-formatted in the CPDLC format), or, in the opposite case, by VHF radio). The information contained in the authorization request is for example available via the multifunction interface 4. The latter could further comprise controlling means (not shown) allowing, when they are activated by the pilots, to directly transmit the authorization request to the air traffic control 5.

When an aircraft present in the control volume V to be considered prevents the altitude change maneuver from being performed according to the ITP procedure, an explanation over the origin of the denial could be provided to the pilots of the airplane AC, via the multifunction interface 4, optionally accompanied with a time information for subsequently performing the maneuver (for example, the time when the altitude change maneuver could be performed). It is also possible to obtain detailed information on this aircraft selecting it in the list of aircrafts located in the control volume.

In the case where more than two reference aircrafts are present in the control volume V to be considered, an information message can be displayed on the multifunction interface 4. In such a case, the pilots can configure again the desired altitude change maneuver by entering another target altitude level to be reached in the multifunction interface 4, via the page dedicated to the altitude change within reduced spacings according to an ITP procedure.

Furthermore, once the request has been transmitted to the air traffic control 5, the controller could send, as a reply, a clearance for performing the altitude change maneuver according to the ITP procedure. In such a case, the pilot in charge checks that the altitude change maneuver within reduced spacings is still feasible, searching the page of the multifunction interface dedicated to the altitude change according to an ITP procedure.

If the maneuver is still feasible, the pilot in charge accepts the clearance and initiates the altitude change maneuver according to the ITP procedure.

An information message over the on-going maneuver could be displayed on the page of the multifunction interface 4 dedicated to the altitude change according to an ITP procedure.

In an alternative embodiment in accordance to the present invention, the device 1 is able to determine the available altitude levels, being accessible to the airplane AC via an altitude change maneuver within reduced spacings, while meeting the separation standards between airplanes of the ITP in trail altitude change procedure.

In such an alternative, the available altitude levels are displayed on a page dedicated to the multifunction interface 4, so that pilots can select the desired target altitude level.

Once the selection has been made, the located aircrafts relevant for the altitude change maneuver within reduced spacings are listed, for instance, in another page of the multifunction interface 4.

Furthermore, it can be seen that, within the scope of the present invention, when an aircraft not provided with ADS-B communication means, (particularly emission ADS-B communication means) is present in the control volume V to be considered, the information is provided to the pilots, for example, via the multifunction interface 4. Upon aircrafts being located in the control volume V, as the device 1 of the invention only takes into account aircrafts provided with emission ADS-B communication means for performing an altitude change maneuver in accordance to the ITP procedure ITP, the latter is therefore feasible. The air traffic control 5 will remain responsible for the separation distances between the airplane AC and the aircrafts in the control volume (including the possible aircrafts not provided with ADS-B communication means) upon the altitude change according to the ITP procedure.

Figure 3A:
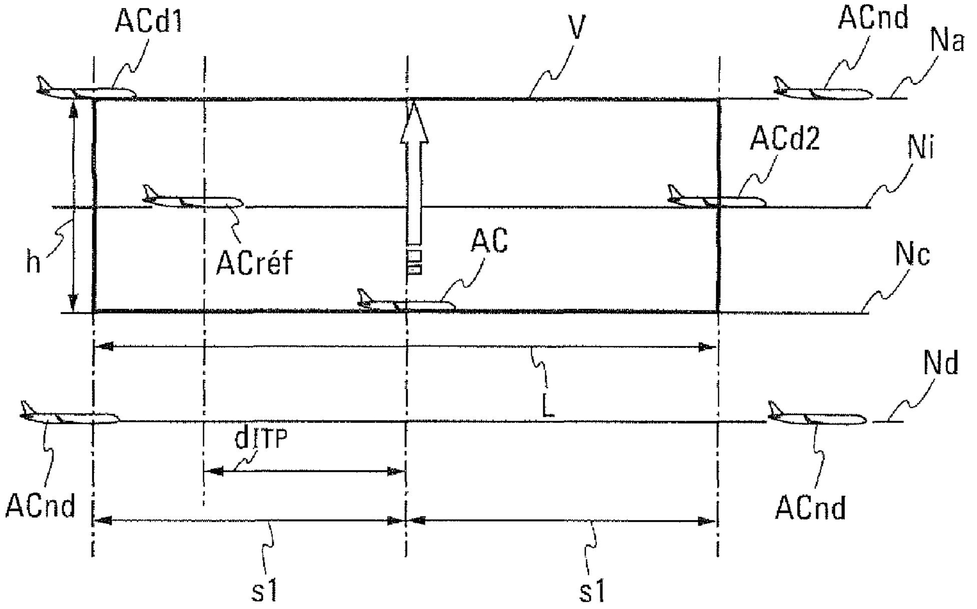
FIGS. 3A to 3C schematically illustrate successive phases of an examplary altitude change maneuver within reduced spacings according to the ITP procedure, in accordance to the present invention.
Figure 3B:
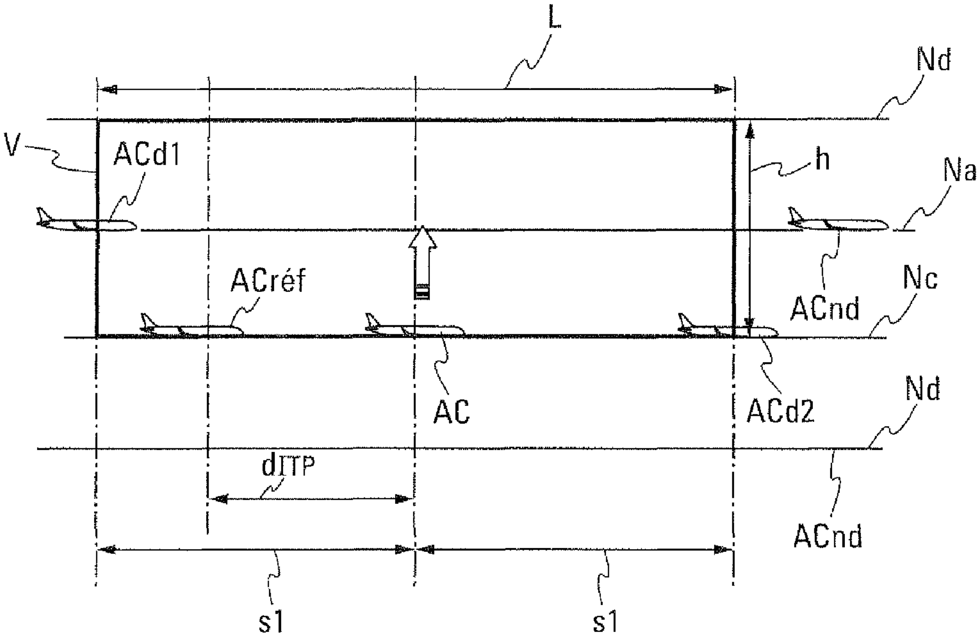
Figure 3C:
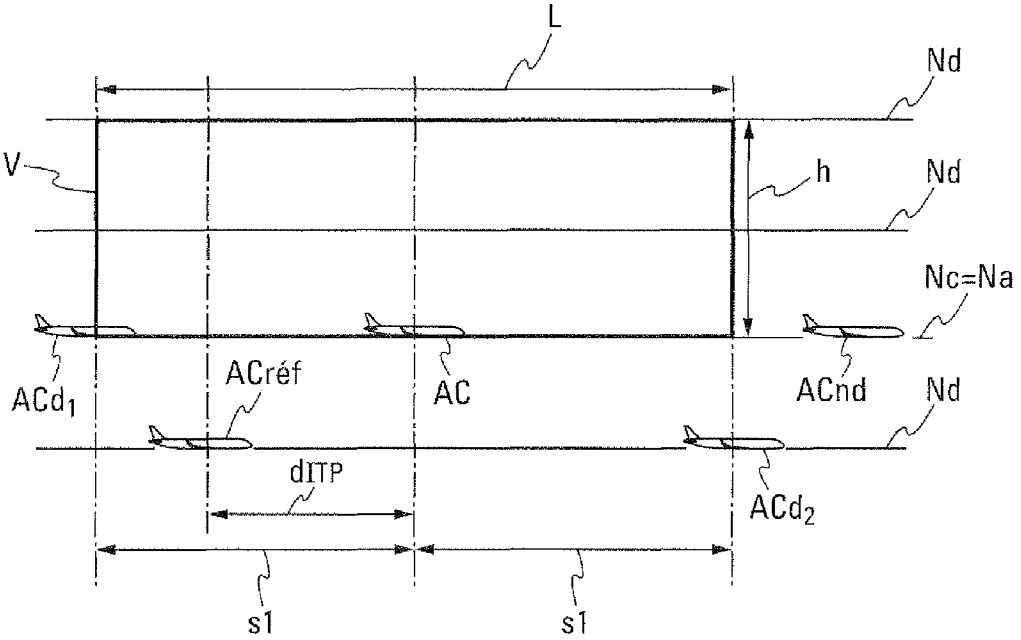

On FIGS. 3A to 3C, there are illustrated, at successive moments, an examplary altitude change maneuver within reduced spacings for reaching a target altitude level Na (higher than the current altitude level Nc of the airplane AC), according to the ITP in trail altitude change procedure, in accordance with the present invention.

In this example, as shown on FIG. 1, three aircrafts ACref, ACd1 and ACd2 are present in the control volume V at the initial time when the altitude change maneuver is being initiated by the pilots.

Amongst these three aircrafts, there are:

- a reference aircraft ACref, flying at an intermediary altitude level Ni between the current altitude level Nc of the airplane AC and the target level Na and being separated from the airplane AC within the ITP distance (dITP). Such a reference aircraft ACref is behind the airplane AC; and
- two aircrafts ACd1 and ACd2, not being reference aircrafts. One of these two aircrafts ACd2 flies on the same intermediary altitude level N1 as the reference aircraft ACref and is positioned ahead of the airplane AC, whereas the other aircraft ACd1 flies at the target altitude level Na and is behind the airplane AC. They are both separated from the airplane AC by the horizontal separation standard s1.

The altitude change maneuver within reduced spacings desired by pilots is thus to be contemplated. It is then initiated by the pilots.

As shown on FIG. 3B, upon such a maneuver, maintaining the horizontal velocity thereof constant and having a vertical velocity at least equal to a vertical velocity threshold (for example, equal to 300 feet per minute), the airplane AC crosses the intermediary altitude level Ni for reaching the target altitude level Na selected by the pilots (levels Nd are auxiliary altitude levels). A status information regarding the development of the maneuver according to the ITP procedure is then provided to pilots via, for instance, the multifunction interface 4.

As illustrated on FIG. 3C, once the target altitude level Na is reached, the airplane AC proceeds with the cruising flight thereof at the optimum altitude level thereof. Na, while meeting the horizontal separation standards enforced by the OACI.

It is also to be noticed that, on such a FIG. 3A, three other aircrafts ACnd are represented. These three aircrafts are not located by the device 1 because they do not belong to the control volume V to be considered; and that the minimum distance ITP (dITP), established by the OACI, is defined as follows:

either the velocity difference between the located aircraft in the control volume V is lower than 20 kts, whereas the minimum distance ITP is equal to 15 nautical miles;

or the velocity difference between the located aircraft in the control volume V is lower than 30 kts, whereas the minimum distance ITP is equal to 20 nautical miles.

The invention claimed is:

1. A method for facilitating performing an altitude change maneuver within reduced spacings of an airplane (AC) flying at a current altitude level (Nc), according to a given course, for capturing a target altitude level (Na), said airplane (AC) being provided with receiving means (2) for information relating to aircrafts flying in an air environment in the vicinity of said airplane (AC), comprising:

defining, via a processor, a target altitude level to be captured (Na), based on a received target altitude level selection;

determining, via a processor, a control volume (V) around said airplane (AC), a first dimension (h) of which is a function of the altitude difference between said current level (Nc) and said target level (Na), a second dimension (L) of which depends on a first distance threshold (s1) and a third dimension (I) of which depends on a second distance threshold (s2), wherein the first distance threshold is a predefined horizontal separation between the airplane and at least one other aircraft flying in the air environment, wherein the second distance threshold is a predefined side separation between the airplane and at least one other aircraft flying in the air environment, and wherein the second distance threshold is measured in a direction perpendicular to the first distance threshold;

locating, via a processor, the presence of at least one aircraft (ACd1, ACd2, ACref) inside said control volume (V);

checking, via a processor, whether the following activation conditions are met:

the distance separating said airplane (AC) from said located aircraft is strictly lower than said first distance threshold (s1) and is at least equal to a third distance threshold (dITP), wherein the third distance threshold is a predetermined minimum separation distance between the airplane and at least one other aircraft flying in the air environment; and the angle formed between the course of said airplane (AC) and the course of said located aircraft is at the most equal to a predefined angle threshold; and when said located aircraft (ACref) meets said activation conditions, from information from said located aircraft (ACref) received by said reception means (2), determining, via a processor, a performing time range, during which said altitude change maneuver is able to be performed, wherein a performing authorization request is generated automatically, via a processor, but held until a pilots' order is received to transmit the request to air traffic control (5).

2. A method according to claim 1, wherein said time range is determined only when at least one and at the most two aircrafts (ACref) are located in said control volume (V) and they each meet said activation conditions.

3. A method according to claim 1, wherein said performing time range is determined from the relative velocity of said airplane (AC) with respect to said located aircraft (ACref) meeting said activation conditions and the relative position of said airplane (AC) with respect to said aircraft (ACref).

4. A method according to claim 1, wherein said authorization request comprises relative position information of said airplane (AC) with respect to said located aircraft (ACref) meeting said activation conditions, as well as information relating to the desired altitude change maneuver within reduced spacings.

5. A method according to claim 1, wherein said control volume (V) has the form of a rectangular parallelepiped with the height thereof (h) corresponding to said first dimension.

6. A device for facilitating performing an altitude change maneuver within reduced spacings of an airplane (AC) flying at a current altitude level (Nc), according to a given course, for capturing a target altitude level (Na), said airplane (AC) being provided with receiving means (2) for information relating to aircrafts flying in an air environment in the vicinity of said airplane (AC), comprising:

means (4) for defining a target altitude level (Na) to be captured, based on a received target altitude level selection;

means (7) for determining a control volume (V) around said airplane (AC), a first dimension (h) of which is a function of the altitude difference between said current level (Nc) and said target level (Na), a second dimension (L) of which depends on a first distance threshold (s1) and a third dimension (I) of which depends on a second distance threshold (s2), wherein the first distance threshold is a predefined horizontal separation between the airplane and at least one other aircraft flying in the air environment, wherein the second distance threshold is a predefined side separation between the airplane and at least one other aircraft flying in the air environment, and wherein the second distance threshold is measured in a direction perpendicular to the first distance threshold;

means (8) for locating the presence of at least one aircraft (ACd1, ACd2, ACref) inside said control volume (V);

means (9) for checking that the following activation conditions are met:

the distance separating said airplane (AC) from said located aircraft is strictly lower than said distance threshold and is at least equal to a third distance threshold (dITP), wherein the third distance threshold is a predetermined minimum separation distance between the airplane and at least one other aircraft flying in the air environment; and the angle formed between the course of said airplane (AC) and the course of said located aircraft is at the most equal to a predefined angle threshold; and means (10) for determining, from information from said located aircraft (ACref) received by said receiving means (2), a performing time range during which said altitude change maneuver is able to be performed, said means (10) being activated when said located aircraft (ACref) meets said activation conditions, wherein a performing authorization request is generated automatically, via a processor, but held until a pilots' order is received to transmit the request to air traffic control (5).

7. A device according to claim 6, wherein it comprises means (11) for automatically generating a performing authorization request to be transmitted, on pilots' order, to the air traffic control (5).

8. An airplane, comprising a device (1), according to claim 6.

* * * * *